Dec. 12, 1933.     W. HARNISCHFEGER     1,938,658
APPARATUS FOR HANDLING AND STORING
Filed Dec. 29, 1928     3 Sheets-Sheet 1
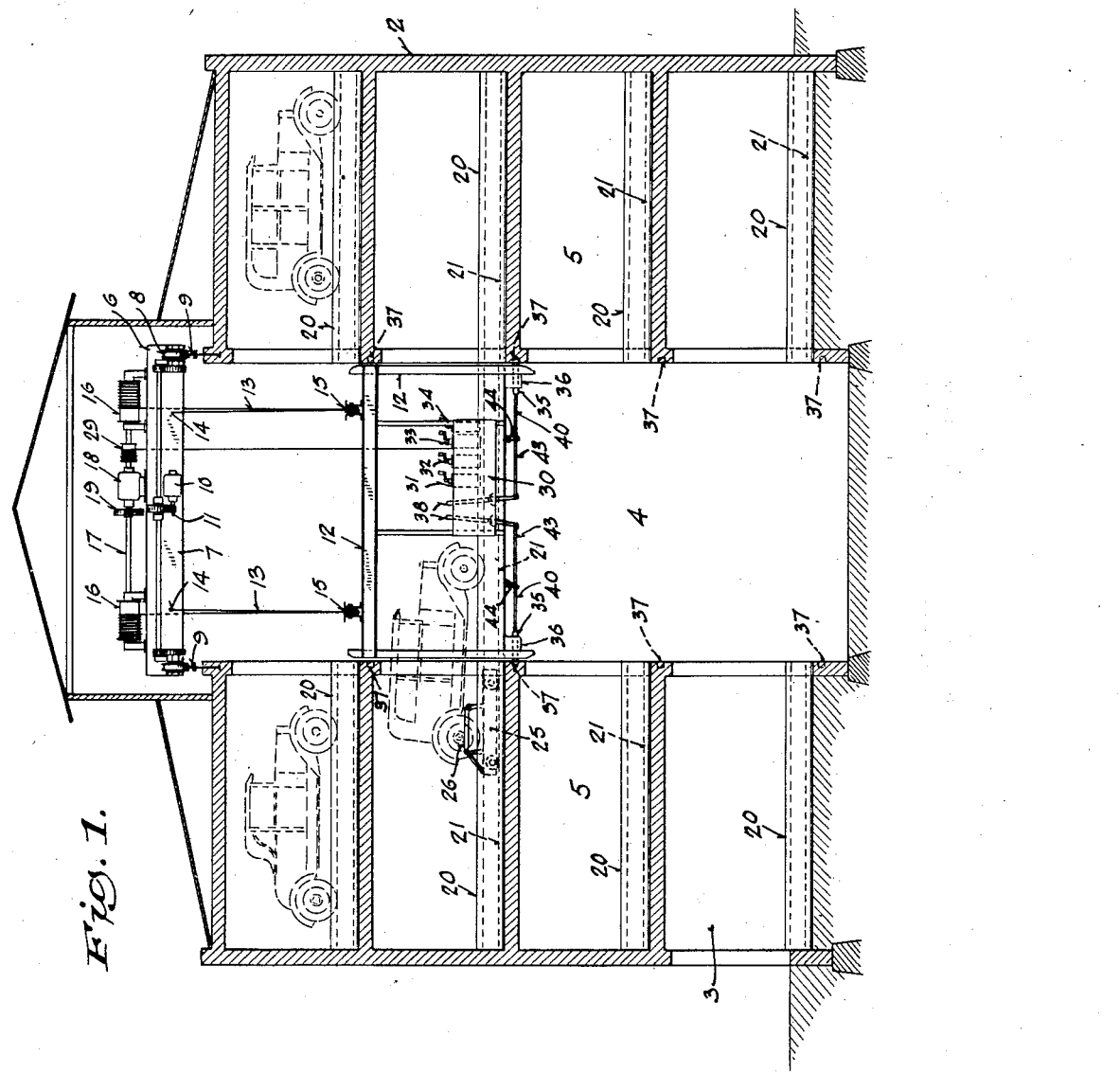
INVENTOR.
Walter Harnischfeger
BY
ATTORNEY.

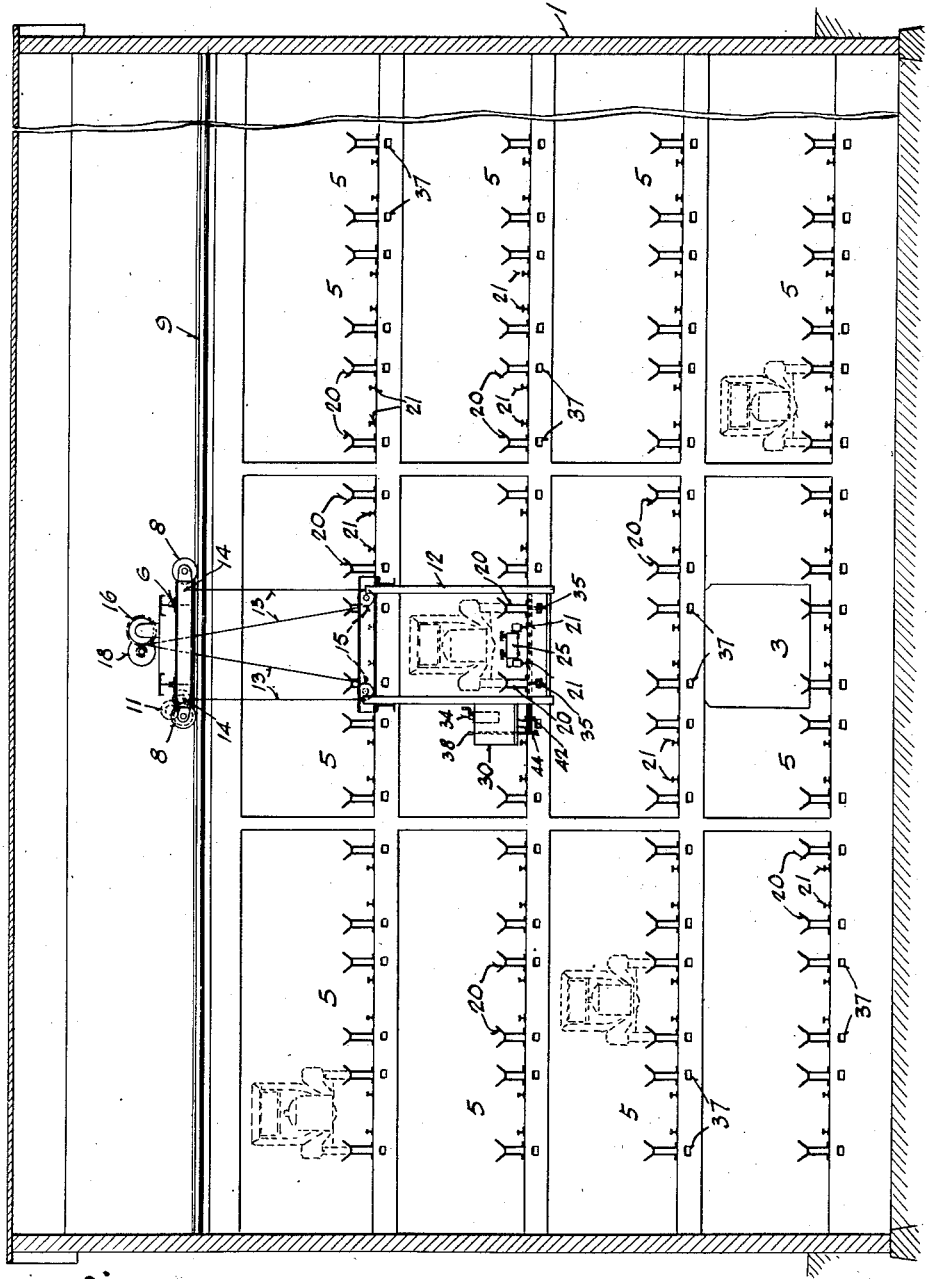

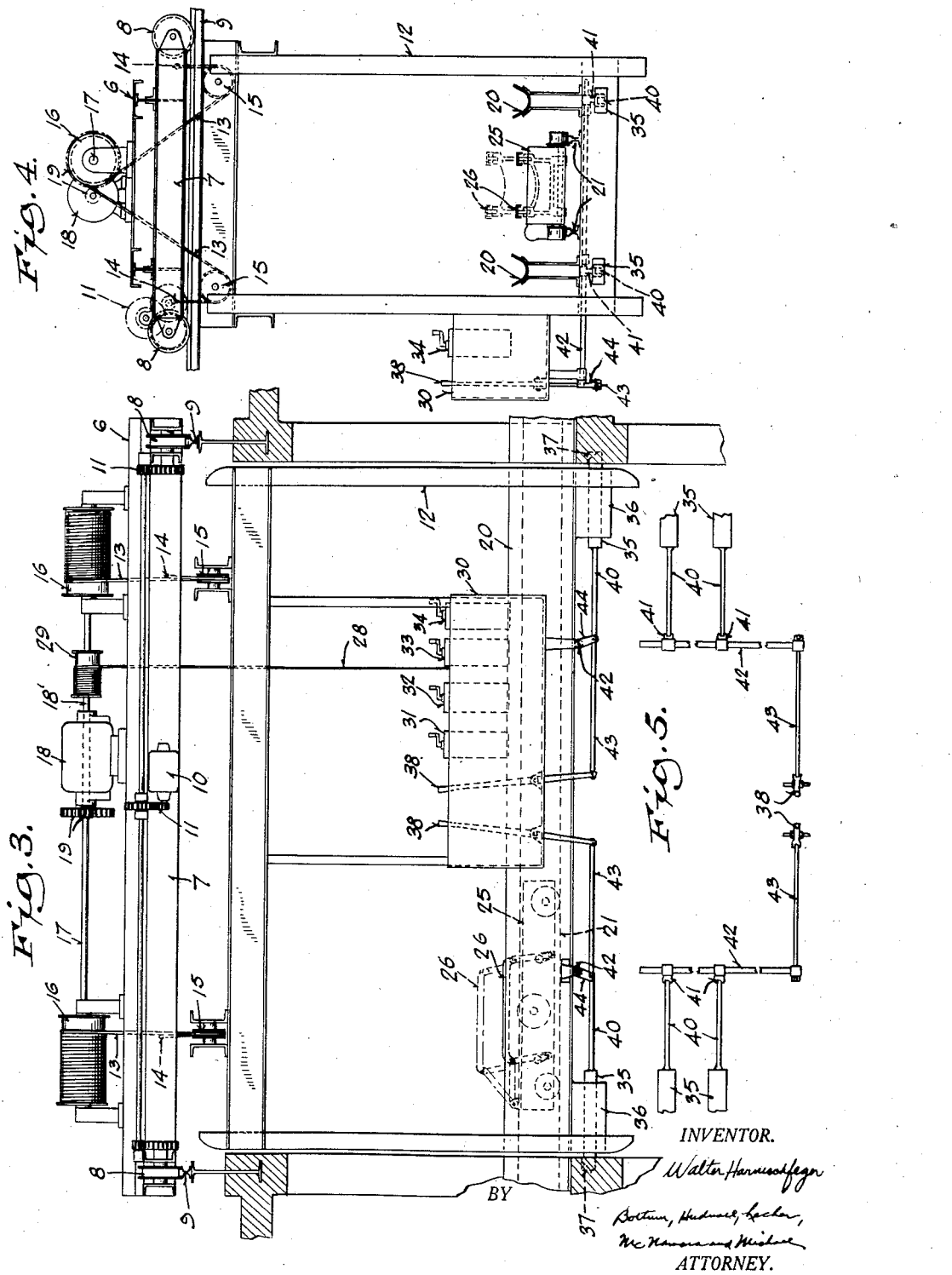

Patented Dec. 12, 1933

1,938,658

UNITED STATES PATENT OFFICE 1,938,658

APPARATUS FOR HANDLING AND STORING

Walter Harnischfeger, Milwaukee, Wis., assignor to Harnischfeger Corporation, Milwaukee, Wis., a corporation of Wisconsin Application December 29, 1928, Serial No. 329,199

6 Claims. (Cl. 214—16.1)

This invention relates in general to a handling and storing apparatus and is particularly, although not necessarily, designed and adapted for use in the handling and storing of vehicles such as automobiles and the like.

One of the principal objects of the invention is to provide an apparatus of this character capable of handling and storing a relatively large number of automobiles or the like with ease and rapidity and by means of a simple and economical construction involving a minimum of handling equipment so that the original cost as well as the operating cost of the apparatus is reduced to a minimum.

In carrying out the present invention a garage construction is provided which has a vertical shaft or aisle extending the full height of the building and also for practically the full length thereof. A plurality of horizontal rows of storage compartments or stalls are disposed on the opposite sides of the shaft or aisle and are arranged one above the other so that on each side of the shaft there is a plurality of adjacent vertical tiers of storage compartments. Each compartment is equipped with runways adapted to receive the wheels of the vehicle and with rails providing a track for a dolly or transfer means. Above the shaft a high speed traveling crane is provided and, of course, may be brought into vertical alinement with any of the tiers of storage compartments. Suspended from the crane is a cage or platform, the cage being supported by cables controlled, that is, raised and lowered, by motor driven drums on the crane whereby the cage may be alined and levelled with any particular storage compartment of any tier. On the floor of the cage or platform, runways, adapted to receive the wheels of an automobile or other vehicle and rails providing a track for the dolly, are provided and when the cage is alined with any compartment or stall its runways and rails are alined with the runways and rails of the compartment or stall. As indicated, a dolly is mounted on the platform or cage and has flanged wheels which run on the rails thereof. Preferably, the rails are located between the runways and the dolly has a jack or other suitable means cooperable with the automobile to constrain it to move with the dolly. A control station is provided on the cage and has controllers for regulating the horizontal movement of the crane along the shaft, for regulating the vertical movement of the cage, for regulating the movement of the dolly or transfer means, and for regulating the raising and lowering of the jack or other means provided on the dolly for causing the automobile to move with the dolly. Means may be provided for locking or releasably securing the cage vertically and transversely alined with any stall or compartment.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in transverse vertical section showing an apparatus embodying the present invention and adapted for the handling and storing of vehicles;

Figure 2 is a view thereof in central vertical longitudinal section;

Figure 3 is an enlarged view in elevation illustrating the means for handling the automobiles and showing the adjacent portions of the building structure in section;

Figure 4 is a view in end elevation looking toward the left in Figure 3; and

Figure 5 is a fragmentary plan view of one form of operating mechanism for the locking means.

Referring to the drawings, the numeral 1 designates a building construction having the usual outside walls 2 and an entrance-way 3 leading into a central well or shaft 4 which extends the full length of the building and from the ground floor to the roof thereof. Storage stalls in the form of compartments or storage spaces 5 are provided in the building structure on the opposite sides of the shaft 4 and are arranged in vertical tiers with the tiers on one side transversely alined with the tiers on the other. The construction of the building may be widely varied and yet the essential arrangement of storage stalls or spaces had. As illustrated, the building has a plurality of floors with storage stalls on each floor but obviously the building may be of skeleton construction with the runways and rails of the stalls (hereinafter described) supported on the frame work of the building.

Above the shaft 4 a high speed traveling crane 6 is provided and may embody any conventional and well known construction. As illustrated, the crane 6 has a transverse frame structure 7 mounted on flanged supporting wheels 8 which travel on rails 9 supported by the building structure and extending along the margins of the shafts 4. The wheels 8 are driven from an electric motor 10 through suitable motion transmission means or gearing 11. A cage 12 is provided and is suspended from the crane by means of cables 13, each cable 13 having one end deadended as at 14 on the frame of the crane and having an intermediate portion reeved through a pulley 15 rotatably mounted on the cage 12. Each cable 13 is also secured to and wrapped around a drum 16 fixed on a drum shaft 17 journaled in suitable bearings on the crane and driven from an electric motor 18 by means of gearing 19. It is to be understood that the term cage comprehends a platform, car or any other suitable form of vehicle supporting means.

The entrance-way 3, the stalls 5, and the platform 12 are provided with runways 20 and rails 21, the runways 20 being adapted to receive the wheels of an automobile or other vehicle and being of identical construction and similarly spaced and arranged in the entrance-way, in the stalls, and on the platform, thereby facilitating the transfer of the automobile from the entrance to the platform and from the platform to the stalls and vice versa. In the stalls or storage compartments, the runways 20 may slope or incline inwardly and downwardly to preclude the automobiles from accidently running out of the stalls, but this is not essential as in lieu thereof or in addition thereto suitable locking means or chocks may be employed for releasably holding the automobile in the stalls. The rails 21 are also of identical construction and equally spaced throughout the apparatus so that the dolly or transfer carriage 25 may run off of the platform into the entrance-way and back onto the platform and also off of the platform and into a stall and then back onto the platform as the rails on the platform may be lined up with the rails in the entrance-way or with the rails in the stalls to provide a substantially continuous trackway in either event. The dolly 25 includes a motor driven wheeled frame and suitable motor actuated means 26 adapted to be engaged with and disengaged from the vehicle for the purpose of causing the vehicle to move with the dolly when desired. The dolly, its jack and the controls therefor may be identical with those fully shown and described in the pending application of Arthur G. Henricks for Apparatus for handling and storing, filed August 20, 1927, Serial Number 214,617, to which application reference is made for a full disclosure of this construction, operation and control. It is to be understood, however, that the dolly may take any suitable form and is not limited to the precise construction shown in the Henricks application referred to.

A control station designated at 30 is located on the platform or cage 12 and has controllers 31, 32, 33 and 34 for regulating the action of the motors of the crane and the motors of the dolly and its jack, respectively. The controllers are of any conventional or appropriate construction and are electrically connected with the motors or with the controlling circuits thereof in accordance with conventional practice or in any other suitable manner. The type of controllers utilized with the dolly and its jack are fully illustrated in the Henricks application above referred to. The exact hook-up per se of these parts forms no part of this invention, as this invention is concerned in this respect merely with the location of the controls for the crane and dolly at a single station on the platform where they are adapted to be manipulated by a single operator who is always in position to realize and accurately observe just how the controls should be manipulated to effect the desired movements of the cage or dolly.

As shown in Figure 3, a cable 28 carries the conductors which electrically connect the controllers 31 and 32 with the motors 10 and 18 on the crane, the cable being wound on a drum 29 fixed to and rotating with the drum shaft 17. As the motor driven drum shaft 17 controls the raising and lowering of the cage 12, the cable 28 will be reeled up or paid out automatically as the cage 12 is raised or lowered.

It is to be understood that various types of crane constructions may be employed and particularly the present invention contemplates using the well known double or parallel drum construction for the hoist unit of the crane.

Means may be provided for releasably locking the cage or platform in alinement with any stall and for the sake of illustration this means is shown as consisting of locking bolts 35 slidably fitted in bearings 36, provided on the cage 12 and adapted to be projected into keeper sockets 37 formed in the building structure adjacent each compartment or stall and adjacent the entrance-way. Any suitable operating mechanism may be provided for the bolt 35. For the sake of illustration the operating mechanism is shown as consisting of hand levers 38, there being one hand lever for the bolts at each end of the cage. As shown in Figures 3, 4 and 5, there are two bolts 35 at each end of the cage and each bolt 35 has a rearwardly directed operating rod 40 connected thereto. The rods 40 at each end of the cage are constrained to corresponding movement by means of crank arms 41 fixed to a transversely extending rock shaft 42 and having pin and slot connections or other appropriate connections with the operating rods 40. The lever 38 associated with each set of bolts 35 is pivotally connected to one end of a connecting rod 43 and the other end of the connecting rod 43 is pivotally connected to a crank arm 44 fixed to the rock shaft 42 whereby manipulation of a hand lever 38 simultaneously shifts both bolts at one end of the cage.

With this construction an automobile is driven into the entrance-way 3 with its wheels located in the runways 20 thereof. The driver then gets out of the machine and leaves it to the control of the storing and handling means embodying the present invention. The cage 12 is then brought down to aline with the entrance-way and the operator on the cage manipulates the dolly controller to send it out under the car and manipulates the jack controller to elevate the jack to engage with the car. The dolly is then run back onto the cage and carries the automobile with it. Next, the cage is moved horizontally or elevated or is moved in both directions to bring the cage into alinement with the stall into which the automobile is to be stored. The dolly is then utilized to run the automobile into the selected stall. Usually it will be desirable to lock the cage in alinement with the selected stall to prevent undesirable tipping. To deliver a car this process is reversed, the cage being first alined with the stall in which the car is parked, the dolly utilized to transfer the car from the stall in which it has been stored to the cage, the cage then shifted to the entrance-way and the car transferred by the dolly from the cage to the entrance-way. If desired, the building may be provided with an exit as well as an entrance-way, and the number of exits and

The invention claimed is:

1. An apparatus for handling and storing vehicles including a building construction having a shaft extending full length and height thereof and having vertical tiers of stalls on the opposite sides of the well, there being an entrance-way to the well, an overhead crane traveling above the well, a cage suspended from the crane and moved horizontally and vertically thereby so as to be alined with any stall or with the entrance-way under the influence of the crane, a motor driven, wheeled dolly mounted on the cage and having means to engage a vehicle to constrain it to move with the dolly, the dolly being operable to take a car from the entrance-way and place it on the cage and to transfer the vehicles from the cage to the stalls and vice versa, said entrance-way, cage and stalls having runways adapted to receive the wheels of the vehicle, the runways of the entrance-way and of the stalls being alined with the runways of the cage when the cage is alined with the entrance-ways and stalls respectively, said cage, said entrance-way, and said stalls having rails providing trackways for the dolly, the trackways of the entrance-way and of the stalls being alined with the trackways of the cage when the cage is alined with the entrance-way and stalls respectively, whereby travel of the dolly into and out of the entrance-way and stalls and on and off of the cage is facilitated.

2. An apparatus for handling and storing vehicles including a building construction having a shaft extending full length and height thereof and having vertical tiers of stalls on the opposite sides of the well, there being an entrance-way to the well, an overhead motor operated crane traveling above the well, a cage suspended from the crane and moved horizontally and vertically thereby so as to be alined with any stall or with the entrance-way under the influence of the crane, a motor driven dolly mounted on the cage and having motor driven means to engage a vehicle to constrain it to move with the dolly, the dolly being operable to take a car from the entrance-way and place it on the cage and to transfer the cars from the cage to the stalls and vice versa, and a single control station on the cage having means for regulating the action of the motors of the crane and dolly.

3. A garage construction having a plurality of vertical tiers of stalls arranged on the opposite sides of a shaft, the shaft extending for the full length of the tiers and for the full height of the adjacent tiers, a high speed overhead crane running along and above the shaft, a cage flexibly suspended from the crane and shifted horizontally and vertically thereby, whereby it may be alined with any stall and a dolly mounted on the cage and movable off of the cage into a stall and back from a stall onto the cage, and means for releasably locking the cage alined with any stall.

4. An apparatus for handling and storing vehicles including a building construction having a plurality of storage stalls, a cage, means for shifting the cage vertically and horizontally to aline it with any storage stall, said cage and said storage stalls having runways adapted to receive the wheels of vehicles and also having rails providing tracks, the runways and rails of the cage being alined with the runways and rails of any storage stall with which the cage is alined and a motor driven wheeled transfer carriage mounted on the rails of the cage and having means adapted to engage a vehicle and constrain it to move with the carriage, said carriage being adapted to be run across the rails of the cage and onto the rails into a storage stall and then back onto the rails of the cage to effect transfer of the vehicle from a cage to a storage stall and vice versa.

5. An apparatus for handling and storing including a building construction having a well and a plurality of vertical tiers of storage stalls along the well, a trackway above and along the margins of the well, a crane including a frame having wheels running along the trackway, an electric motor actuated drive for said crane, electric motor driven drums on said frame, a cage, cables suspending the cage from the crane, the cables being wrapped around the drums whereby the drums may be rotated to raise and lower the cage and thus, in conjunction with the crane, to aline the cage with any storage stall, a motor driven transfer carriage mounted on the cage and adapted to be run off of the cage and into any stall, motor driven article engaging means carried by the transfer means and operable to engage an article and constrain it to move with the transfer means, and a central control station on the cage for the motors of the crane and the motors of the transfer carriage.

6. An apparatus for handling and storing including a building construction, having a well and a plurality of vertical tiers of storage stalls along the well, a trackway above and along the margins of the well, a crane including a frame having wheels running along the trackway, an electric motor actuated drive for said crane, electric motor driven drums on said frame, a cage, cables suspending the cage from the crane, the cables being wrapped around the drums whereby the drums may be rotated to raise and lower the cage and thus, in conjunction with the crane to aline the cage with any storage stall, and motor driven transfer means mounted on the cage and having motor driven means to engage a vehicle and constrain it to move therewith, said transfer means being operable to transfer a vehicle from the cage to a stall and vice versa, said cage and said storage stalls having runways adapted to receive the wheels of a vehicle.

WALTER HARNISCHFEGER.